C. L. BOPP.
AUTOMATIC SIGNALING DEVICE.
APPLICATION FILED JUNE 30, 1911.

1,173,922.

Patented Feb. 29, 1916.
4 SHEETS—SHEET 1.

Fig. 1.

Witnesses
J. M. Fowler Jr.
W. H. Wakefield

Inventor
Clinton L. Bopp.
By Mason Fenwick & Lawrence
Attorneys

C. L. BOPP.
AUTOMATIC SIGNALING DEVICE.
APPLICATION FILED JUNE 30, 1911.

1,173,922.

Patented Feb. 29, 1916.
4 SHEETS—SHEET 3.

Fig. 3.

Witnesses
J. M. Fowler Jr.
W. H. Wakefield.

Inventor
Clinton L. Bopp.

By Mason, Fenwick & Lawrence
Attorneys

C. L. BOPP.
AUTOMATIC SIGNALING DEVICE.
APPLICATION FILED JUNE 30, 1911.

1,173,922.

Patented Feb. 29, 1916.
4 SHEETS—SHEET 4.

Fig. 4.

Witnesses
J. M. Fowler Jr.
W. H. Wakefield

Inventor
Clinton L. Bopp.
By Mason Fenwick & Lawrence
Attorneys

UNITED STATES PATENT OFFICE.

CLINTON L. BOPP, OF HAWKEYE, IOWA.

AUTOMATIC SIGNALING DEVICE.

1,173,922.   Specification of Letters Patent.   Patented Feb. 29, 1916.

Application filed June 30, 1911. Serial No. 636,170.

*To all whom it may concern:*

Be it known that I, CLINTON L. BOPP, a citizen of the United States, residing at Hawkeye, in the county of Fayette and State of Iowa, have invented certain new and useful Improvements in Automatic Signaling Devices; and I do hereby declare the following to be a full, clear, and exact description of the invention, such as will enable others skilled in the art to which it appertains to make and use the same.

This invention relates to improvements in signaling systems, and particularly to relay devices associated with indicating devices designed to automatically indicate the position of trains over a particular track.

The object in view is the arrangement in an automatic railway signaling system, of means for indicating the position of a train as the same passes from station to station along the system, and for insuring the successful operation of the indicating devices when two or more trains are running close together.

A further object of the invention is the provision of an accumulating and relaying apparatus formed with a plurality of switching devices designed to accumulate signals when the indicating devices along the track to which the apparatus is connected are prevented from indicating by the action of a previous train until the means for preventing the indication has been removed, said accumulated signals being adapted to be unloaded or released at the proper time for causing the proper operation of the indicating devices affected.

A still further object of the invention is the arrangement in a train signaling system, of wiring along the track having connected therewith an indicating device at each station and an accumulating and relaying apparatus at each station, and a switch designed to be operated by trains passing over the track, the relays being arranged to cause the proper operation of the indicating means for indicating the position of trains along the system.

With these and other objects in view the invention comprises certain novel constructions, combinations, and arrangement of parts as will be hereinafter more fully described and claimed.

In the accompanying drawings.

In constructing the signaling system which is the subject matter of this invention, two line wires are used. If it is desired to use the system for two tracks, then a duplication of the system here described will be necessary, which, of course, would necessitate four line wires. Each of the stations ranged along the track has a switch operated by the train, an indicator and an accumulating and relaying apparatus which are connected to two line wires, as will be more fully described hereinafter. After all of these devices have been connected properly with the line wires a train starting from the first station over the system will operate the indicator or indicating device at the first station, and substantially at the same time will operate all the remaining stations ahead of the first station over the entire system for indicating at all the stations that a train has left the first station. As soon as the train has arrived at and passed over the switch at the second station all of the indicating mechanisms in front of the train will be operated again for showing the new position of the train, the indicating mechanism at the second station being locked against movement by a second train, and the indicating mechanism at the first station being unlocked ready for operation by a second train. The second station which is locked will be held in a locked position until the first train has passed over the switch at station 3, whereupon the indicating mechanism at station 3 will be locked and the indicating mechanism at station 2 will be unlocked. This action is continued for the full length of the system so that the stations ahead of the train will know the position at all times of the first train, and the stations in rear of the first train will be free for operation by a succeeding train, except the last station passed.

In order that the invention may be more clearly understood an embodiment of the same is shown in the accompanying drawings, in which A indicates an indicator and B an accumulating and relaying apparatus. There is, of course, an indicator and apparatus B at each station, the connections at any one station being shown by any one of the figures. In order to bring in more clearly the functions of the various devices and the results attained, the same are described in connection with the passage of two trains over the system which will operate the various devices according to the position and movement of the trains. The respective indicators A and relaying and accumulating devices B are suitably connected with main line wires 2 and 3, and also with the ground, so that current may travel over varying circuits according to the way the various switching devices or contact members are operated. The indicators A at each station are preferably formed or constructed as disclosed in my Patent No. 1,114,429, issued October 20, 1914, but if desired some other suitable structure may be provided. However, each of the indicators A must be provided with traveling tape 4, and means for operating the same, including a pivotally mounted member 5 which may be attracted by magnet 6 when energized. In tracing the circuit of magnet 6 current will travel from battery 7, through wire 8, binding post 2$^a$, wire 10, armature 11, contact 12, wire 13, the winding of magnet 6, wire 14, binding post 1$^a$, and from thence through wire 16, battery 7. Current, of course, only flows in this circuit when armature 11 has been attracted by magnet 17, as hereinafter fully described, which, of course, closes the circuit between armature 11 and contact 12. Tape 4 at station 1 is provided with the name of station 1, which name is merely duplicated any desired number of times thereon according to the length of the tape. Each time that a train passes over the switch 1 at station 1, tape 4 will be moved a predetermined distance. At each movement of tape 4 the name of station 1 will be disclosed. Indicator A at station 2 is constructed similar to indicator A at station 1, but the tape 4 thereof is provided with the names of stations 1 and 2 alternately, so that when the tape is first operated the name of station 1 will appear, and when the tape is operated a second time the name of station 2 will appear. Upon the third operation of tape 4 at station 2 the name of station 1 will appear, etc. These names are repeated over and over as often as the switches 1 at stations 1 and 2 are operated. The same arrangement is provided in regard to the indicators at stations 3 and 4, except that at station 3 the names of stations 1, 2, and 3 are provided on the tape, and at station 4 the names of stations 1, 2, 3 and 4 are provided. By this arrangement when switch 1 at station 1 is closed the name of station 1 will appear on the tapes of all four stations, and if there should be more stations than four, of course, the name of station 1 will appear on the tapes of all the stations. When the first train has closed switch 1 at station 2 all of the indicators A, except the one at station 1, will be operated for disclosing the name of station 2. As the train advances and passes the respective stations the indicators at the stations ahead will be operated for continuously showing the position of the train, but the stations in the rear are not operated.

Assuming the first condition, namely, that the first train is at station 1, and all of the indicators A are in a normal position with the tapes therein indicating the respective stations at which the respective indicators are positioned so that the next movement will indicate station 1, it is designed that the respective indicators A at all the stations will be operated substantially at the same time when the train passes over or closes switch 1 at station 1. When the switch 1 at station 1 is closed in this manner current will flow through the respective indicators, and through part of the respective relays. For the purpose of tracing the circuit it will be assumed that the current will start at switch 1, station 1, from which it will pass through wire 18 of apparatus B, station 1, binding post 14$^b$, wire 19, the winding of magnet 20, wire 21, wire 22, binding post 9$^b$, wire 23, battery 24, wire 25, binding post 8$^b$, wire 26, binding post 2$^b$, wire 27, binding post 5$^a$, of indicator A, from which the current passes through the indicator A, station 1. Tracing the circuit from binding post 5$^a$, of indicator A station 1, the current will pass through wire 28, the winding of magnet 17, wire 29′, wire 30, binding post 3$^a$, and from thence through wire 31 to the ground, and from the ground back to track switch 1 of apparatus B, thus completing the circuit. The flow of current in this circuit will cause magnet 20 of the relay at station 1 to become energized, and also the magnet 17 of the indicator A, at station 1. The energizing of magnet 17 will cause a movement of armatures 11 and 33, which will close contacts at points 12 and 34, whereby current will pass from battery 7 to magnet 6 for moving tape 4

(station 1) already described. The circuit for relaying the indications to the stations ahead is as follows: Current flows from the ground through wire 31, binding post 3ª, wire 30, armature 33, contact 34, wire 73, binding post 4ª, wire 74, binding post 1ᵇ of indicator B station 1, wire 75, wire 76, armature 71, contact 79, wire 77, wire 78, contact 79′ (which is normally closed) wire 80, wire 81, binding post 15ᵇ, line wire 3, binding post 6ᵈ, of station 2, wire 83, wire 22, binding post 9ᵈ, wire 23, battery 24, wire 25, binding post 8ᵈ, wire 26, binding post 2ᵈ, wire 27, binding post 5ᶜ, wire 28, magnet 17, wire 29′, wire 30, binding post 3ᶜ, wire 31, and return to the ground at station 2, thus completing the circuit. The energizing of magnet 17, station 2, produces the same result that the energizing of magnet 17 at station 1 produces. In this manner all the indicator controlling magnets of the succeeding stations are energized so that as train 1 operates the switch 1 at station 1 all the indicator magnets are energized. After the current has passed through the various devices at station 2 in a similar manner to the way that it passed through the same devices at station 1, the current will then flow through the main line wire to station 3 and act in a similar manner, and from thence through the main line wire to station 4, and act on the various devices at that station. It will be understood, of course, that only the indicators will be operated, the relaying apparatus permitting the passage of current from one station to another without operation. At the same time that magnet 17, station 1, was energized, armature 11 of the indicator A, station 1 was attracted. When the armature 11 was attracted current was caused to flow from battery 7 (station 1) through wire 8, binding post 2ª, wire 10, armature 11, contact 12, wire 13, the winding of magnet 6, wire 14, binding post 1ª, wire 16, and from thence back to battery 7. Current flowing in this circuit will cause the magnet 6 to become energized, which in turn will cause tape 4 to rotate one step forward.

When magnet 20 is energized the same will move armature 35, which will cause current to flow through a circuit including magnet 36. Starting with armature 35 current will pass through wire 37, the winding of magnet 36, wire 38, wire 39, wire 40, wire 93, wire 41, binding post 3ᵇ, wire 42, battery 43, wire 44, binding post 4ᵇ, wire 45, binding post 13ᵇ, wire 68 back to armature 35, thus completing the circuit. Current flowing in this circuit will energize magnet 36 and cause the same to attract armature 47 rigidly connected with lever 48, which lever is pivotally mounted at one end and is normally held away from magnet 36 by retractile spring 49. When lever 48 is moved against the action of spring 49 the same will partially rotate a ratchet wheel 50 as the ratchet wheel is connected with the lever by a link 51. A pawl 52 is pivotally mounted on a notched or serrated member 53, and is designed to engage the teeth of ratchet wheel 50 for preventing any reverse movement thereof independent of the pawl. If desired a friction spring 54 could be provided for insuring engagement of the ratchet wheel by the pawl. On the reverse side of member 53 to the side on which ratchet wheel 50 is positioned is arranged a similar ratchet wheel provided with a pawl for permitting the same to rotate only in one direction. The ratchet wheel on the opposite side of notched member 53 is rigidly connected with member 53 and permits the member 53 to rotate only in the opposite direction to the way that the ratchet wheel 50 rotates when operated by magnet 36. Member 53 and ratchet wheel 50 are loosely mounted upon a supporting shaft, and are not connected in any way except by pawl 52 which will cause the rotation of member 53 when spring 49 moves lever 48 in a reverse movement. From this it will be observed that when magnet 36 is energized ratchet wheel 50 will be moved in one direction, and when the magnet 36 is deënergized ratchet wheel 50 and member 53 will be moved in the opposite direction under the action of spring 49. The condition of the circuits up to the releasing of armature 47 by magnet 36 is shown in full lines in Fig. 1 and it is assumed that the train is still holding down switch 1 at station 1.

Figure 1:
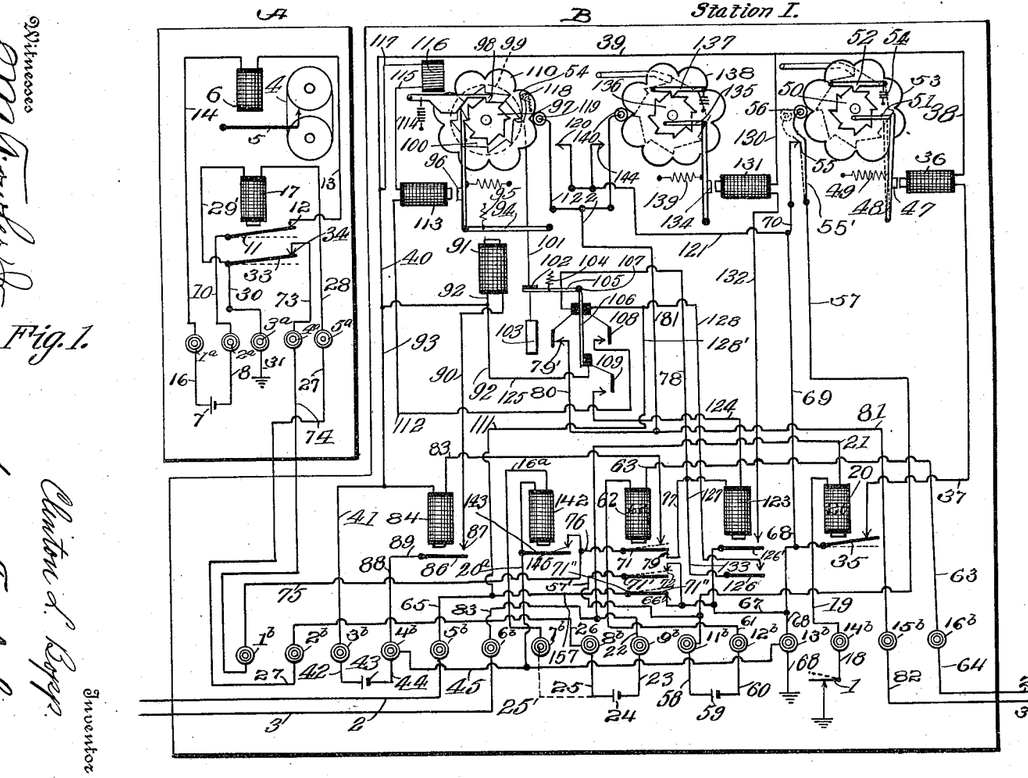
Figure 1 is a diagrammatic detail view of station 1, the circuits in full lines representing the condition when a train is just at station 1, while the dotted lines show the condition of the station just after the train has passed.
Figure 2:
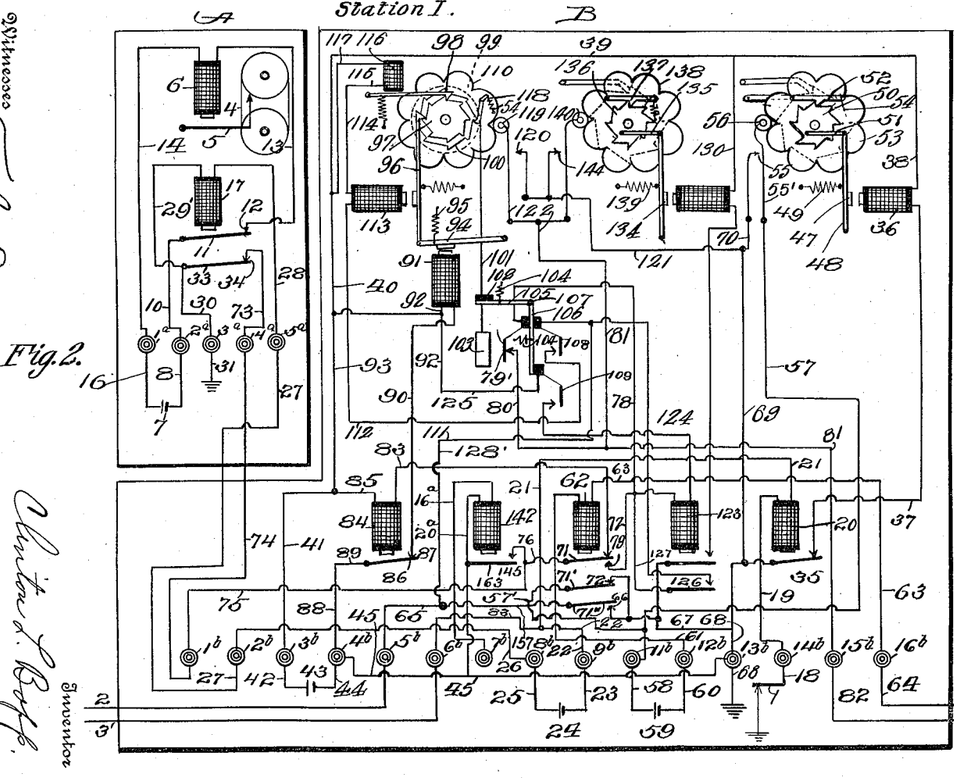
Fig. 2 is also a diagrammatic detail view of station 1, the condition of circuits shown being that existing when the first train has passed station 1 and a second train is at the switch of station 1.

The second assumption is that train 1 has passed station 1 and is between stations 1 and 2 and switch 1 is raised, these conditions being shown in dotted lines Fig. 1. Adjacent to the member 53 is a switch contact 55 adapted to coöperate with a conductive spring 55′, carrying at its ends cam roller 56, which as the cam roller 56 rolls or passes over the rounded projections of member 53, closes circuit to contact 55 causing current to flow through wire 57, binding post 11ᵇ, wire 58, battery 59, wire 60, binding post 12ᵇ, wire 61, the winding of magnet 62, wire 63, binding post 16ᵇ, wire 64, to line wire 2 along line wire 2 to binding post 5ᵈ of apparatus B, station 2 (see Fig. 2), wire 65, station 2, armature 71″, contact 66, wire 67, wire 68, binding post 13ᵈ, and from thence to the ground, and through the ground back to station 1 to binding post 13ᵇ, apparatus B at station 1, wire 68, wire 69, wire 70, to contact 55, thus completing the circuit. Current flowing in this circuit will energize magnet 62, and cause the armatures 71, 71′ and 71″ to be attracted (station 1) shown in dotted lines Fig. 1. When these armatures are attracted two contacts will be broken and two contacts made, but when contacts 72 are made current will flow from the ground to binding post 13ᵇ, through wire 68, wire 67, contacts 72, armature 71', wire 57', binding post 11ᵇ, wire 58, battery 59, wire 60, binding post 12ᵇ, wire 61, the winding of magnet 62, wire 63, binding post 16ᵇ, wire 64, to line wire 2, and from thence to apparatus B, station 2 through binding post 5ᵈ, wire 65, armature 71'', contact 66, (as shown in Fig. 2), wire 67, wire 68, binding post 13ᵈ, to ground, thus completing the circuit, of magnet 62 at station 1. This is a stick relay circuit holding magnet 62 energized and depending for maintenance upon the deënergization of magnet 62 at station 2. It will be noted that the armatures 71, 71' and 71'' have not been attracted in the relaying apparatus at station 2, though the same are attracted at apparatus 62, station 1, so that current may flow in the circuit just described. Current flowing in this circuit will cause the armatures 71, 71' and 71'' station 1, to stay in their attracted position until the train arrives at station 2, and operates track switch 1, at station 2, which causes the armatures 71, 71' and 71'' at station 2 to be attracted, and thus open the circuit at contact 66, station 2. The action of the magnets 62, and their armatures 71, 71' and 71'' may be termed locking and unlocking, and is used throughout the entire system as the train passes therethrough.

The third condition arises when the second train enters the system and closes switch 1 at the first station, the first train being between the first and second stations. Assuming that the first train is between stations 1 and 2 and a second train is passing switch 1 at station 1 the second train will operate the indicator at station 1 but will not operate indicator at station 2 as station 1 is locked. If it had been assumed that the train was between stations 3 and 4 then the presence of a train at station 1 would have resulted in operating indicators at stations 1, 2 and 3, but not 4 as station 3 would be locked. In this case, the system would have been divided into two blocks, the dividing point being station 4. Under the present assumption, however, station 2 is the dividing point, one block being behind and one ahead of station 2. The conditions about to be described are shown in Fig. 2, where it is assumed that a train is at the switch at station 1, and relay 62 is energized for effecting the locking operation above described.

Upon the passing of a second train over the track switch 1 at station 1 current will pass from the ground at station 1, through track switch 1, wire 18, binding post 14ᵇ, wire 19, magnet 20, wire 21, wire 22, binding post 9ᵇ, wire 23, battery 24, wire 25, binding post 8ᵇ, wire 26, binding post 2ᵇ, wire 27, binding post 5ᵃ of indicator A, station 1, wire 28, magnet 17, wire 29', wire 30, binding post 3ᵃ, wire 31 to ground, and through ground back to switch 1, station 1. Current flowing in this circuit will cause magnet 17 at indicator A station 1 to be energized, and thus attract armatures 11 and 33 for causing the contact thereof with contacts 12 and 34 which will permit current to flow from the ground through wire 31, binding post 3ᵃ, of the indicator A, station 1, wire 30, armature 33, contact 34, wire 73, binding post 4ᵃ, wire 74, binding post 1ᵇ, of apparatus B, station 1, wire 75, wire 76, armature 71, wire 83, magnet 84, wire 85, wire 41, binding post 3ᵇ, wire 42, battery 43, wire 44, binding post 4ᵇ wire 45, binding post 13ᵇ, to the ground, and through the ground back to wire 31 of the indicator at station 1. Current flowing in this temporary circuit will energize magnet 84 for closing another circuit by attracting armature 86 against contact 87.

When magnet 84 attracts armature 86 a second local circuit is provided at station 1. Current in this local circuit just mentioned will flow from battery 43 through wire 44, binding post 4ᵇ, wire 88, wire 89, armature 86, contact 87, wire 90, magnet 91, wire 92, wire 93, wire 41, binding post 3ᵇ, wire 42, back to battery 43, thus completing the circuit. When current passes in this circuit magnet 91 is energized, and consequently will attract pivotally mounted armature 94, which is normally held out of contact with magnet 91 by retractile spring 95. The pivotal movement of lever 94 will pull longitudinally upon the hook shaped member or pawl 96, which engages a ratchet wheel 97, and moves the same one step forward, and at the same time permits the pawl or hook 98 to engage the next succeeding tooth. Ratchet wheel 97 is rigidly mounted upon a shaft which is rigidly secured to drum 99, which drum is also rigidly secured to ratchet wheel 100, so that whenever pawl 96 rotates ratchet wheel 97 one step forward drum 99 will also be rotated one step forward. This movement will cause the tape or band 101 to be wound for a certain distance on drum 99, which will consequently lift the stop or clamp 102, as well as the weight 103. The lifting of the stop 102 permits the retractile spring 104 to open the contact 79' by moving levers 105 and 106 on their pivotal support 107. The levers 105 and 106 are rigidly secured together so as to be moved in unison, and in addition lever 106 has rigidly secured thereto contact members 109 and 108. By opening the contacts 79' current will be prevented from flowing over wires 78 and 80. Also by the operation of lever 106 contacts 108 and 109 will be closed. The passage of current over wire 74, at station 1, causes these operations because the armatures 71, 71′ and 71″ at station 1 are locked, the locking having taken place when the first train passed the station. These operations take place in order that when the armatures 71 at station 1 are unlocked a further movement of certain parts, including the rotating notch member 110, will result for permitting current to operate the indicator at station 2, and also all of the indicators in the rear of the first train as many times as pawl 96 has been reciprocated, so as to indicate correctly on the succeeding indicators in the rear of the first train the position of the second train. When the first train has arrived at station 2 the same will register at that place, and at the same time unlock or release armatures 71′ and 71″ at station 1 as heretofore described.

Figure 3:
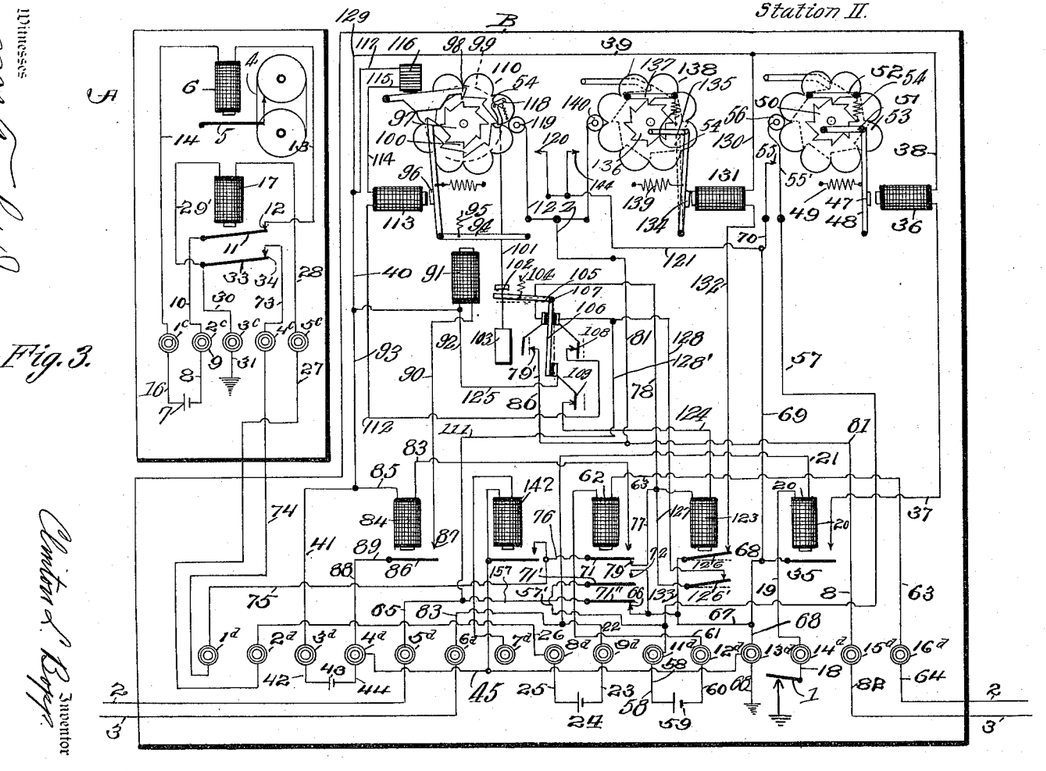
Fig. 3 is a diagrammatic detailed view of station 2, the circuits in the apparatus shown being in such condition as obtains when the first train has passed station 3, station 2 is delivering accumulated signal to station 3 and there is a train at the switch of station 1.
Figure 4:
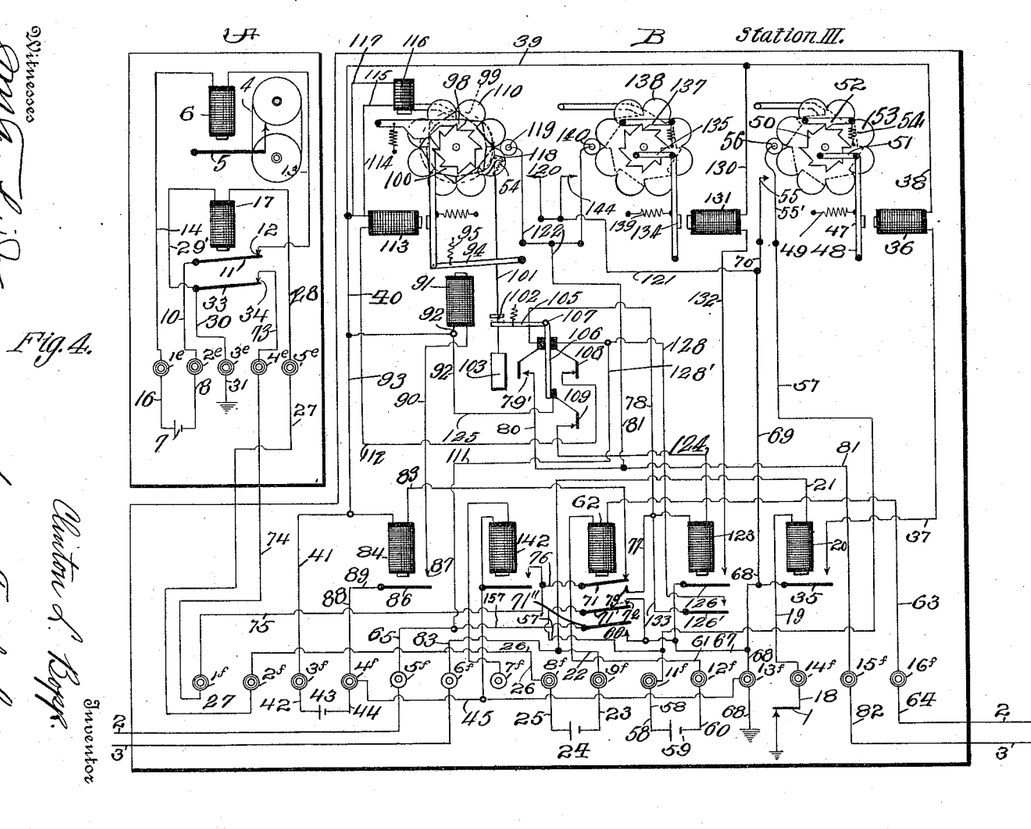
Fig. 4 is a diagrammatic detailed view of the circuits at station 3 showing the same in such condition as will be caused by the passing of the first train beyond station 3, this figure showing the circuits necessary for delivering the accumulated signals from apparatus B at station 2.

The fourth condition will now be described, namely that existing when station 2 is delivering to station 3 and a train is at station 1. The circuits accomplishing the sending of stored signals will first be described. As this operation begins the conditions shown in Fig. 2 will be changed to those shown in Fig. 3. It is understood that the first train has passed station 3 and has therefore unlocked the relay 62 at station 2. Immediately upon the unlocking of armatures 71, 71′ and 71″ 62 at station 2 current will flow from local battery 43, through wire 44, binding post 4$^d$, wire 45, binding post 13$^d$, wire 68, wire 67, contact 66, wire 157, wire 111, wire 128′ contact 108 which have been closed by the raising of stop 102, wire 112, magnet 113, wire 114, wire 115, magnet 116, wire 117, wire 40 wire 93 wire 41, binding post 3$^d$, wire 42, back to battery 43, thus completing the circuit. Current flowing in this circuit will energize magnets 113 and 116, which will in turn attract armatures or pawls 96 and 98, for causing the same to become disengaged from ratchet wheel 97, whereby drum 99 will be released. Upon the releasing of drum 99 weight 103 will move down under the action of gravity and stop 102 will move lever or arm 105 down against the action of spring 104. This action will cause the circuit at contacts 79′ to be closed and the circuits controlled by contacts 108 and 109 to be broken. Pivotally mounted upon notched member 110 is a pawl 118 which engages ratchet wheel 100. Ratchet wheels 97 and 100, and the drum 99 and notched member 110, together with associated devices form an automatic accumulating mechanism which is released when pawls 96 and 98 are moved by magnets 113 and 116. Ratchet wheel 97, drum 99, and ratchet wheel 100 are rigidly connected to their supporting shaft, while notched member 110 is loosely mounted upon the supporting shaft but receives power through pawl 118 when ratchet wheel 100 is moving under the action of weight 103. Upon the movement of the notched member 110 the cam wheel or roller 119 is moved back and forth for each notch, and upon each back and forth movement closes the circuit controlled by contact 120. Ratchet wheels 97 and 100 are constructed with an equal number of teeth so that the same degree of rotation will be made by both members. When the automatic accumulating mechanism is operating as just described in connection with station 2, current will flow from the ground at station 2, to binding post 13$^d$, through wire 68, wire 69, wire 121, contact 120, wire 122, wire 81, binding post 15$^d$, wire 82, line wire 3 to the apparatus at station 3 (see Fig. 4), binding post 6$^f$, wire 83, wire 22, binding post 9$^f$, wire 23, battery 24, wire 25, binding post 8$^f$, wire 26, binding post 2$^f$, wire 27, to the indicator at station 3, and through the indicator at station 3 for causing the proper operation thereof, and thus completing the circuit to the ground.

Assuming that the automatic accumulating device at station 2 is performing the last function mentioned, namely, the rotation of the notched member 110, and pawls 96 and 98 are disengaged so that contact is made at 120, it will be evident that if a second train closes any of the track switches 1 in the rear of station 2 the automatic accumlating mechanism will not be affected by the current flowing from the indicator at station 2. This arrangement is provided so that the automatic accumulating mechanism may complete its operation for unloading. The signal circuits from a point behind the second station leads to the indicator A, station 2 without including movable contacts. The magnets 113 and 116 remain energized independently of the indicator circuits, these magnets being in a local circuit receiving current from battery 43. While the automatic accumulating mechanism is thus unloading a second automatic accumulating mechanism is loaded when one of the track switches in rear of station 2 is operated. The automatic accumulating mechanism including notched member 110 is not in condition for receiving impulses when operating as the same might conflict with the current turned into the circuit by the second train. When the automatic accumulating mechanism, including the notched member 110 is operating or is unloading, weight 103 is raised and stop 102 is not pressing against arm or lever 105, so that contacts 109 are closed in order that current switched into the circuit by a second train may pass. The current from station 1 passes through indicator A, station 2 and thereby energizes the electromagnet 17 which attracts armature 33. In tracing the circuit the current will pass from the ground at station 2, wire 31, binding post 3$^e$, wire 30, armature 33, contact 34, wire 73, binding post 4ᶜ, wire 74, binding post 1ᵈ, wire 75, wire 76, armature 71, contact 79, wire 77, magnet 123, wire 124, contact 109, wire 125, wire 92, wire 93, wire 41, binding post 3ᵈ, wire 42, battery 43, wire 44, binding post 4ᵈ, wire 45, binding post 13ᵈ, to the ground, and from the ground back to the indicator (station 2), thus completing the circuit. By current flowing in this circuit, including the contact 109 which was made as the result of a circuit closed by the succeeding train, it will be observed that the magnet 123 will be energized and attract armature 126 and 126′ for closing two contacts.

When armature 126′ is attracted current will flow from battery 43 through wire 42, binding post 3ᵈ, wire 41, wire 93, wire 92, wire 125, contact 109, wire 124, magnet 123, wire 127, armature 126′, wire 128, wire 128′, wire 111, armature 71″, contact 66, wire 67, wire 68, binding post 13ᵈ, wire 45, binding post 4ᵈ, wire 44, back to battery 43. It will be observed that when the succeeding train passes over track switch 1 a circuit is provided, including magnet 123, which magnet, of course, is energized, and will remain energized as long as the train is holding track switch 1 closed. As track switch 1 is only held closed momentarily the circuit just described with current from battery 43 is provided for maintaining magnet 123 energized after the second train has passed the track switch, and until the circuit controlled by contact 109 is broken. By this arrangement the armatures 126 and 126′ are caused to stick or remain in their attracted position until the automatic accumulating devices have finished operating or unloading and the circuits at contacts 108 and 109 have been broken by means of weight 103. At the time that magnet 123 is energized and while armatures 126 and 126′ are in their attracted position, current will flow from battery 43, over wire 42, binding post 3ᵈ, wire 41, wire 93, wire 40, wire 129, wire 39, wire 130, magnet 131, wire 132, armature 126, wire 133, wire 67, wire 68, binding post 13ᵈ, wire 45, binding post 4ᵈ, wire 44, back to battery 43, thus completing the circuit for magnet 131. Upon the energization of magnet 131 the same will cause the operation of pivotally mounted armature 134 and associated parts, similar to the operation caused when magnet 36 is energized. Upon movement of armature 134 power will be conveyed through link 135 to ratchet wheel 136 for moving the same one step forward, and causing pawl 137 to engage the next succeeding notch. Ratchet wheel 136 is loosely mounted upon its journal, and also the notched rotating member 138 is loosely mounted upon the same supporting member. The notched member 138 is provided with a ratchet wheel similar to ratchet wheel 136, except that the teeth extend in the opposite direction and engage a pawl which will permit the notched member 138 to move only in one direction and only when operated by retractile spring 139 which acts upon pivotally mounted armature 134, and from thence conveys power to ratchet wheel 136. From ratchet wheel 136 power is conveyed through pawl 137 to notched member 138 for rotating the same. From this it will be observed that magnet 131 causes a movement of ratchet wheel 136 in one direction, but does not affect the position of notched member 138, while spring 139 upon the deënergization of magnet 131 will move ratchet wheel 136 in a reverse direction, and will carry with it notched member 138. Upon movement of notched member 138 the cam roller 140 will be moved back and forth once for temporarily closing the circuit at contact 144. However, the magnet 131 is maintained energized and the reverse movement of member 138 does not take place until the automatic accumulating mechanism, including notched member 110, has completed its movement under the action of weight 103, whereupon the circuits controlled by contacts 108 and 109 will be opened and those controlled by contact 79′ will be closed. This will open the stick relay circuit around magnet 123 and will consequently open the circuit of magnet 131 so that armature 134 will be released and permitted to move back under the action of retractile spring 139 for causing a reverse movement of ratchet wheel 136 and notched member 139. This circuit including magnet 131 is as follows: armature 126, wire 132, electromagnet 131, wire 130, wire 39, wire 40, wire 93, wire 41, binding post 3ᵈ, wire 42, battery 43, wire 44, binding post 4ᵈ, wire 45, binding post 13ᵈ, wire 68, wire 67, wire 133 back to armature 126. This movement, as heretofore described, will cause a back and forth movement of the cam roller 140 and the momentary closing of circuits controlled by contacts 144. Upon the closing of contacts 144 current will flow from the ground to binding post 13ᵈ, wire 68, wire 69, wire 121, contact 144, wire 122, wire 81, binding post 15ᵈ, (station 2) and then over the main line wire 3 through the apparatus B at station 3, and from the apparatus B at station 3 over wire 27 to the indicator at station 3, and from thence to the ground, and from the ground back to the apparatus B at station 2, thus completing the circuit. This circuit is as follows: from line wire 3 the current will pass through binding post 6ᶠ (Fig. 4) wire 83, wire 22, binding post 9ᶠ, wire 23, battery 24, wire 25, binding post 8ᶠ, wire 26, binding post 2ᶠ, wire 27, wire 29, wire 30, binding post 3ᵉ, wire 31 to ground, thus completing the circuit. Of course, the energizing of electromagnet 17 at indicator A of station 3 (shown in Fig. 3) will be accompanied by the operation of the indicator tape 4, as has already been explained. The flowing of current in this circuit will cause the indicator at station 3 to register one more impulse in order that the indicator will show that the second train has passed station 1. It will be noted that the action in this last condition described will only take place when the accumulating mechanism, including notched member 110 has finished moving. In this way the closing of the track switch 1 by any succeeding train will cause proper mechanism to be operated which will eventually permit or cause the operation of the indicators at the various stations ahead as soon as the condition of the relays will permit such operation so that the contact or closing of the switch by the second or succeeding trains will be preserved and properly delivered at the proper time.

The movement of all of the notched members 53, 110 and 138 are preferably regulated by a suitable friction spring or other device 54 applied in any desired manner to the notched members so as to regulate the operation thereof. This is particularly desirable in regard to the notched member 110 in order to regulate the speed or movement of member 110 and the action of weight 103 and stop 102 so as to cause an appreciable length of time to lapse while the contacts 120 are being held closed.

If for any reason it should be desirable to remove indicator A in station 1 or in fact any of the indicators from their respective stations this could be done by connecting battery 24 with binding post 7$^b$, by means of wire 25, and disconnecting the battery from binding post 8$^b$ as indicated in dotted lines, Fig. 1. With the indicator eliminated the things desired to be accomplished by the closing of switch 1 by the train are the energizing of electro-magnet 20 by means of battery 24 and the connecting of binding post 1' to the ground. When the suggested changes are made the following circuit will be closed as train 1 closes switch 1; the current will rise from the ground to switch 1, wire 18, binding post 14$^b$, wire 19, electro-magnet 20, wire 21 binding post 9$^b$, wire 23, battery 24, wire 25, binding post 7$^b$, wire 16$^a$, electro-magnet 142, wire 20$^a$, wire 45 binding post 13$^b$, back to the ground. As this circuit closes armature 143 will be attracted by electro-magnet 142 when the following circuit will be made: The current will rise from the ground, pass binding post 13$^b$, over wire 45, wire 20$^a$, contact 145, wire 76, armature 71, wire 77, wire 78, contact 79', wire 80, binding post 15$^b$, line wire 3, 6$^d$ at station 2, wire 83, binding post 9$^d$, wire 23, battery 24, wire 25, binding post 8$^d$, wire 26, binding post 2$^d$, wire 27, binding post 5$^c$, wire 28, magnet 17, wire 29, wire 30, binding post 3$^c$, wire 31, back to the ground. It will be seen that these circuits accomplish the same result as though electro-magnet 17 had been energized and had closed contact 34.

In the arrangement of the contacts the same may be made either of the spring variety or adjustable variety, or a combination of both, as found desirable for any particular case. Also in the use of all or most of the armatures a retractile spring may be provided for bringing the armature back to its original position.

In addition to the springs, adjustable stops are also to be provided so as to limit the swinging movement of the respective armatures in order to cause the same to act in the most efficient manner.

I claim—

1. In an electric system for indicating the location of railway trains, a switch and an electrically operated indicating device at certain of the stations, the indicating device at a given station relaying to another station, means connecting each switch with its respective indicating device for causing a signal to be received upon closing said switch, a signal accumulating device adapted to be located adjacent to the track, and means for causing the accumulating device to operate for receiving a signal from the indicating device when said switch is closed a second time.

2. In an electric system for indicating the location of railway trains, a switch and an electrically operated indicating device at certain of the stations, means connecting each switch with its respective indicating device for causing a signal to be received upon closing said switch, a signal accumulating device adapted to be located adjacent to the track, and means for causing the accumulating device to operate for receiving a signal from the indicating device when said switch is closed a second time before the apparatus adjacent to the switch has returned to normal.

3. In an electric system for indicating the location of railway trains, a switch and an electrically operated indicating device at certain of the stations of the system, the indicating device at a given station relaying to another station, means connecting each switch with its respective indicating device for causing a signal to be received upon closing said switch, a signal accumulating device adapted to be located adjacent to the track, means for causing the accumulating device to operate for receiving a signal from the indicating device when said switch is closed a second time, and means for again placing the accumulating device in operation for transmitting the signal thus received.

4. In an electric system for indicating the location of railway trains, a switch and an electrically operated indicating device at certain of the stations of the system, means connecting each switch with its respective indicating device for causing a signal to be received, a signal accumulating device adjacent to a given indicating device, a second accumulating device, means whereby the indicating device last mentioned controls certain of said accumulating devices, and means for controlling another indicating device from the accumulating device last mentioned.

5. In an electric system for indicating the location of railway trains, a switch and an electrically operated indicating device at certain of the stations, means connecting each switch with its respective indicating device for causing a signal to be received, a signal accumulating device adjacent to a given indicating device, a second accumulating device, means whereby the indicating device last mentioned controls certain of the accumulating devices, means for controlling another indicating device from one of said accumulating devices, and means for controlling the indicating device last mentioned from the other of said accumulating devices after the signal received by the first accumulating device has been transmitted therefrom.

6. In an electric system for indicating the location of railway trains, a switch and an electrically operated indicating device at certain of the stations, means connecting each switch with its respective indicating device for causing a signal to be received, an electrically and mechanically operated accumulating device adjacent to a given indicating device, a second signal accumulating device, means whereby the given indicating device controls certain of said accumulating devices, and means for controlling another indicating device from the accumulating device last mentioned.

In testimony whereof I affix my signature in presence of two witnesses.

CLINTON L. BOPP.

Witnesses:
MAYME MURRAY,
H. M. COWLES.

Copies of this patent may be obtained for five cents each, by addressing the "Commissioner of Patents, Washington, D. C."